United States Patent
Shin

(10) Patent No.: US 8,839,497 B2
(45) Date of Patent: Sep. 23, 2014

(54) MACHINING APPARATUS AND PROCESS

(75) Inventor: Yung C. Shin, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 941 days.

(21) Appl. No.: 12/708,959

(22) Filed: Feb. 19, 2010

(65) Prior Publication Data

US 2011/0048183 A1 Mar. 3, 2011

Related U.S. Application Data

(60) Provisional application No. 61/153,752, filed on Feb. 19, 2009.

(51) Int. Cl.
*B23K 26/00* (2014.01)
*B23B 27/10* (2006.01)
*B23P 25/00* (2006.01)
*B23Q 11/10* (2006.01)

(52) U.S. Cl.
CPC .............. *B23B 27/10* (2013.01); *B23P 25/006* (2013.01); *B23B 2222/88* (2013.01); *B23Q 11/1053* (2013.01); *B23B 2260/092* (2013.01)
USPC ......... 29/27 C; 82/1.11; 407/11; 219/121.65; 219/121.67; 219/121.72; 219/121.84

(58) Field of Classification Search
USPC ............ 219/121.65, 121.67, 121.84, 121.72; 21/27 C; 82/1.11; 407/11; 29/27 C
See application file for complete search history.

(56) References Cited

U.S. PATENT DOCUMENTS

| | | | | |
|---|---|---|---|---|
| 3,571,877 A | * | 3/1971 | Zerkle | 407/11 |
| 4,008,631 A | * | 2/1977 | Hahn et al. | 82/1.11 |
| 4,229,640 A | * | 10/1980 | Castellani Longo | 219/121.69 |
| 4,356,376 A | * | 10/1982 | Komanduri et al. | 219/121.72 |
| 5,761,974 A | * | 6/1998 | Wang et al. | 82/1.11 |
| 5,901,623 A | | 5/1999 | Hong | |
| 5,906,459 A | * | 5/1999 | Thomas et al. | 409/132 |
| 6,045,300 A | * | 4/2000 | Antoun | 407/11 |

(Continued)

OTHER PUBLICATIONS

Z.Y. Wang, K.P. Rajurkar, Cryogenic machining of hard-to-cut materials, Wear, vol. 239, Issue 2, Apr. 2000, pp. 168-175, ISSN 0043-1648, http://dx.doi.org/10.1016/S0043-1648(99)00361-0. (http://www.sciencedirect.com/science/article/pii/S0043164899003610).*

(Continued)

*Primary Examiner* — Daniel Howell
(74) *Attorney, Agent, or Firm* — Hartman Global IP Law; Gary M. Hartman; Michael D. Winter

(57) ABSTRACT

A machining process and apparatus capable of increasing removal rates achievable when machining titanium and its alloys. The process includes heating a portion of a workpiece with a laser beam, cryogenically cooling a cutting tool with a cryogenic fluid without flowing the cryogenic fluid onto the workpiece, and machining the heated portion of the workpiece with the cutting tool. The apparatus includes a cutting tool, a device for heating a portion of a workpiece with a laser beam prior to being machined with the cutting tool, and a device for cryogenically cooling the cutting tool with a cryogenic fluid without flowing the cryogenic fluid onto the workpiece. The cryogenic fluid is circulated around the cutting tool to achieve a temperature differential between the workpiece and the cutting tool that is capable of improving removal rates and extending tool life at cutting speeds of, for example, above 100 m/min.

20 Claims, 9 Drawing Sheets

(56) References Cited

U.S. PATENT DOCUMENTS

| | | | |
|---|---|---|---|
| 6,666,630 B2* | 12/2003 | Zimmermann et al. | 409/132 |
| 7,002,100 B2* | 2/2006 | Wu et al. | 219/121.69 |
| 7,090,914 B2* | 8/2006 | Yamagata et al. | 428/216 |
| 7,257,879 B1* | 8/2007 | Jancso | 29/566 |
| 7,634,957 B2* | 12/2009 | Ghosh et al. | 82/1.11 |
| 8,053,705 B2* | 11/2011 | Shin | 219/121.76 |
| 2006/0123801 A1* | 6/2006 | Jackson | 62/52.1 |

OTHER PUBLICATIONS

Z.Y.Wang, K.P. Rajurkar, J. Fan, S. Lei, Y.C. Shin, G. Petrescu; Hybrid machining of Iconel 718; International Journal of Machine Tools & Manufacture; 2003; 0890-6955; doi: 10.1016/S0890-6955(03)00134-2.

Edward F. Rossman; Rough milling titanium; Shop Operations; Dec. 2008.

* cited by examiner

MACHINING APPARATUS AND PROCESS

CROSS REFERENCE TO RELATED APPLICATIONS

This application claims the benefit of U.S. Provisional Application No. 61/153,752, filed Feb. 19, 2009, the contents of which are incorporated herein by reference.

BACKGROUND OF THE INVENTION

The present invention generally relates to machining equipment and processes, and more particularly to an apparatus and process for machining titanium and its alloys.

Titanium and its alloys have properties that are quite distinct from other high temperature metal alloys, including nickel-, cobalt-, and iron-based (e.g., iron-nickel) superalloys. For example, titanium alloys (alloys that contain titanium as their predominant constituent) exhibit high strength to weight ratios, good temperature and chemical resistance, and relatively low densities. which make them ideal for applications in the aerospace industry. A particularly notable example is Ti-6Al-4V, whose nominal composition is, by weight, about 6% aluminum, about 4% vanadium, the balance titanium and incidental impurities. The Ti-6Al-4V alloy is extensively used in the aerospace industry due to its excellent properties of high specific strength and corrosion resistance. However, titanium alloys are extremely difficult to machine, and costs associated with their machining are high due to short tool life.

Several explanations for the poor machinability of titanium alloys have been proposed. Titanium has low thermal conductivity, which impedes heat transfer out of the cutting zone while creating high cutting zone temperatures. Titanium also exhibits a high chemical affinity toward cobalt binders found in most cutting tool materials. The interface between the cutting tool and chips produced by a machining operation is usually quite small, which results in high cutting zone stresses. There is also a strong tendency for titanium chips to pressure-weld to cutting tools. Due to these issues, conventional wisdom has been that only uncoated carbide tools, such as WC/Co cermets, are suitable for machining titanium alloys. Because tool-chip interface temperature increases approximately proportional to the square root of cutting velocity and carbide tools quickly lose strength as the temperature goes above several hundred degrees Celsius, tool temperature has limited cutting speeds of titanium using carbide tools to typically less than 60 meters per minute (m/min).

It is well known that heating a workpiece can weaken the workpiece and consequently make machining easier. Laser-assisted machining (LAM) and plasma-enhanced machining (PEM) have both been used to improve the machinability of various materials. However, LAM and particularly PEM also elevate the cutting tool temperature. When LAM and PEM has been used with uncoated carbide tools, improvements in tool life are minimal due to the elevated tool temperature during machining. Therefore, more advanced tool materials, such as ceramics and cubic boron nitride (CBN), are typically employed with LAM and PEM to enable the cutting tool to survive under high temperatures. However, titanium alloys particularly exhibit chemical affinity toward more advanced materials such as ceramic and CBN tools used with LAM and PEM. There have been previous studies on employing LAM techniques when machining titanium, though tool life improvements have not been reported with LAM.

Tool wear during machining of titanium using a carbide tool is governed by diffusion wear, which depends in part on the interface temperature between the cutting tool and the chip removed by the tool. Conventional wisdom has been that reduced tool wear resulting from diffusion wear can be achieved by cooling both the tool and the workpiece to reduce the interface temperature. For this purpose, conventional cooling fluids and more advanced cooling techniques, such as cryogenic-enhanced machining (CEM), have been used. CEM makes use of a cryogenic fluid, such as liquid nitrogen, which is typically directed over the cutting tool so that the fluid also overflows the workpiece. Consequently, conventional wisdom has been that the combination of CEM and either LAM or PEM is counter intuitive because they appear to offset the purpose and advantages of each other.

Due to advantages associated with its mechanical and physical properties, there is a desire for processes and equipment capable of achieving higher removal rates for titanium alloys.

BRIEF DESCRIPTION OF THE INVENTION

The present invention provides a machining process and apparatus capable of drastically increasing removal rates achievable when machining titanium and its alloys. The process is referred to herein as hybrid machining, and makes use of laser-assisted machining (LAM) and a cryogenically-cooled cutting tool. The former entails the use of one or more lasers to locally heat the material immediately ahead of the cutting tool, and the latter entails the use of a cryogenic coolant (such as liquid nitrogen) circulated around the cutting tool to remove heat from the tool and achieve a temperature differential between the material being machined and the cutting tool that is capable of drastically improving removal rates at much higher cutting speeds, for example, about 150 m/min or more, and therefore higher than previously thought possible (higher than conventional speeds of up to 60 m/min).

According to a first aspect of the invention, the process includes heating a portion of a workpiece with a laser beam, cryogenically cooling a cutting tool with a cryogenic fluid without flowing the cryogenic fluid onto the workpiece, and machining the heated portion of the workpiece with the cutting tool.

According to a second aspect of the invention, the apparatus includes a cutting tool, means for heating a portion of a workpiece with a laser beam prior to being machined with the cutting tool, and means for cryogenically cooling the cutting tool with a cryogenic fluid without flowing the cryogenic fluid onto the workpiece.

In contrast to the prior CEM practice of directing a cryogenic fluid such as liquid nitrogen over a cutting tool so that the fluid also overflows the workpiece, the invention employs continuous circulation of a cryogenic fluid to selectively cool only the cutting tool. This approach serves to locally reduce the tool-chip interface temperature without reducing the temperature of the workpiece achieved by laser heating (LAM) to achieve a high tool-workpiece temperature differential.

By combining laser heating and cryogenic cooling of a cutting tool during the machining of titanium and its alloys, both machinability, removal rates, and tool life can be significantly improved, even and especially when utilizing coated carbide tools such as a TiAlN-coated WC/Co tool. In investigations leading to the invention, machinability was unexpectedly improved by a factor of three and cutting speeds of up to about 150 m/min and higher were achieved, compared with conventional maximum speeds of 60 m/min.

Other aspects and advantages of this invention will be better appreciated from the following detailed description.

DETAILED DESCRIPTION OF THE INVENTION

Figure 1:
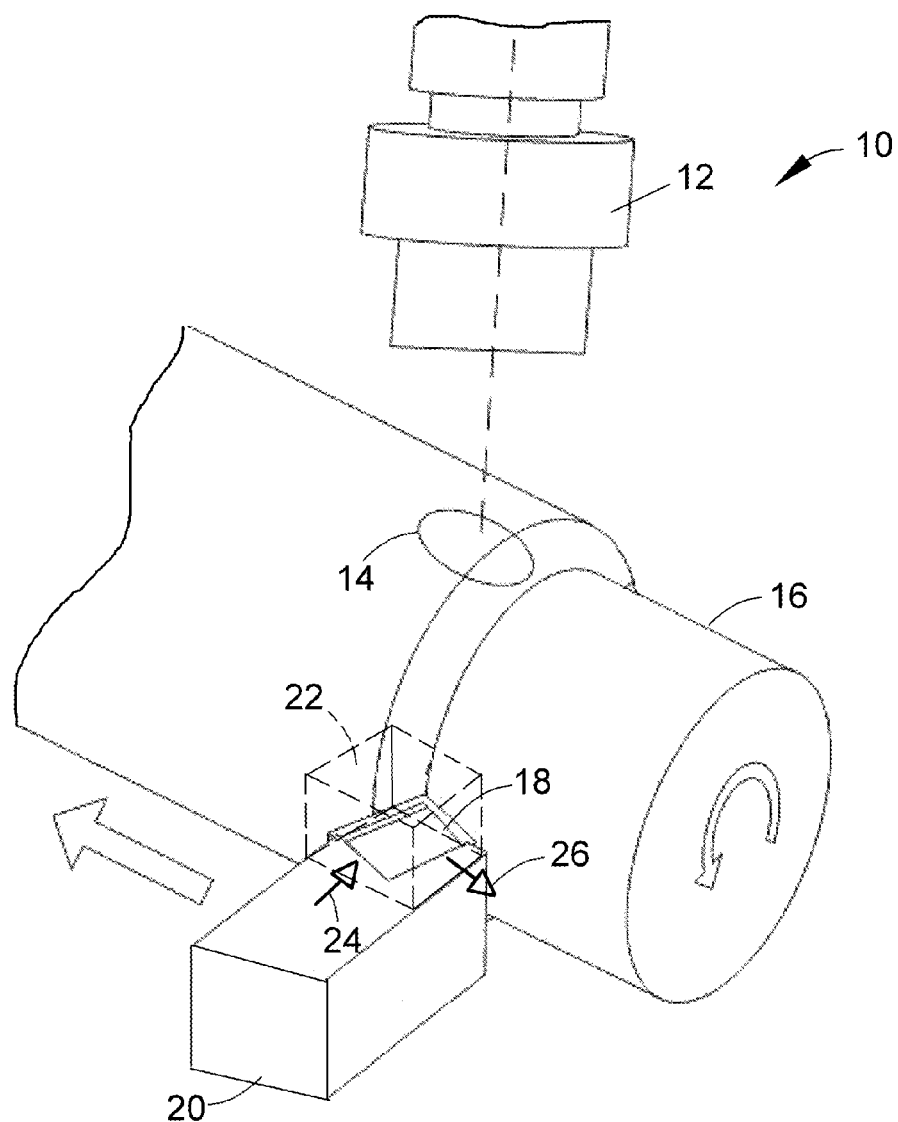
FIG. 1 is a perspective view schematically representing a hybrid machining process performed by hybrid machining equipment in accordance with an embodiment of this invention.

In investigations leading to the present invention, several potential approaches were contemplated for improving the machinability of titanium, maximizing material removal rates (MRR), and increasing tool life, including the use of standard coolants and lubricants, cryogenic cooling, the use of alternate cutting tool materials such as coated carbide cutting tools, and permanently or temporarily altering the workpiece material properties during machining. As reported below, these approaches were investigated through modeling and experiments, and significant improvements in machinability were achieved with a combination of conditions that included the use of certain cutting tool materials, temporarily altering the workpiece material properties through the use of LAM to produce localized heating of the workpiece, and limited cryogenic cooling of the cutting tool, resulting in a technique referred to herein as hybrid machining.

The modeling techniques employed included three-dimensional (3-D) transient thermal models to predict the temperature field in cylindrical workpieces during LAM and a 3-D finite element modeling (FEM) technique to evaluate various machining conditions. The thermal models were validated with an infrared camera to increase the confidence of the material properties used. The 3-D FEM model was implemented to predict the tool life and subsequently optimize the machining conditions in terms of cutting conditions and cutting tool material. Based on this analysis. a combination of LAM heating of the workpiece and cryogenic cooling of the cutting tool was devised, machinability tests were conducted with the titanium alloy Ti-6Al-4V, and the results analyzed to evaluate the affects on machining speed and material removal rates. A limitation imposed on the investigations was to maintain the machined workpiece temperature below 880° C. in order to avoid the phase transformation from the $\alpha$ phase to the $\beta$ phase, which if permitted to occur would reduce the structural integrity of the Ti-6Al-4V alloy. Consequently, the investigations included microstructural analysis and hardness measurements on the workpieces to identify suitable machining conditions.

Machinability tests described herein as laser-assisted or LAM were conducted with a LAM system that included a 20 HP CNC turret lathe and a 1.5 kW $CO_2$ laser. Argon gas was introduced into the cutting zone to prevent oxidation of the laser-irradiated surface of the workpiece and contamination of the laser optics. All of the machining investigations described herein as hybrid machining employed laser heating (LAM) of workpieces in combination with selective cryogenic cooling of only the cutting tools. Liquid nitrogen ($LN_2$) was used as the cryogenic cooling fluid, though it is foreseeable that other fluids and other means capable of a similar cooling capability could be used in place of liquid nitrogen. Consequently, the hybrid machining techniques involved irradiating titanium alloy workpieces with a laser while simultaneously cooling the cutting tool. Conventional coolants and lubricants were not used for any of the machining experiments.

The experimental hybrid machining setup 10 employed during the investigations is schematically represented in FIG. 1, which shows a laser 12 operated to generate a laser beam that irradiates a circular spot 14 on a workpiece 16 mounted on a lathe (not shown). The workpiece 16 is rotated about its axis and undergoes machining with a cutting tool 18 mounted in a tool holder 20. The irradiated spot 14 is located upstream of the cutting tool 18 in the circumferential direction of the workpiece 16 and inward from the cutting tool 18 in the axial direction of the workpieces. For the investigations described below, the irradiated spot 14 was centered about 55 degrees upstream of the cutting tool 18 in the circumferential direction of the workpiece 16, and about 2.5 mm inward from the cutting tool 18 in the axial direction of the workpieces. This impingement location was selected with the intent of minimizing the temperature gradient across the cutting tool 18 and the temperature of the workpiece 16. While this particular location was used in the investigations, other locations for the laser beam impingement on the workpieces could have been used, and it is foreseeable that other impingement locations could be used and obtain benefits and advantages of the present invention. Furthermore, while a single laser beam was employed, it is foreseeable that the workpiece 16 could be heated with multiple laser beams.

As evident from FIG. 1, the hybrid machining technique entailed a modification to the cutting tool holder 20 for the purpose of cooling the cutting tool 18. As represented in phantom in FIG. 1, a reservoir 22 was attached to the tool holder 20 so as to contact the holder 20 and optionally the cutting tool 18 to enable cooling of the cutting tool rake face. Pressurized liquid nitrogen was delivered through protected tubing (not shown) and into the reservoir 22 through an inlet designated by the arrow 24 in FIG. 1. Liquid nitrogen from the reservoir 22 was allowed to flow onto the cutting tool 18 and evaporate. Excess liquid nitrogen exited the reservoir 22 through an outlet designated by the arrow 26 in FIG. 1. Removal of excess liquid nitrogen from the reservoir 22 ensured that cryogenic cooling was limited to the cutting tool 18 and therefore was prevented from affecting the simultaneous heating of the workpiece 16 achieved with the laser 12.

As well known in the art, WC/Co is a cermet material in which the metal constituent (cobalt) serves as a binder to the ceramic constituent (tungsten carbide). WC/Co cutting tools are widely accepted as the best tooling material for machining the Ti-6Al-4V alloy. Therefore a solid uncoated WC/Co cutting tool was chosen for use as a benchmark in the investigation. The uncoated cutting tool was the K68 insert commercially available from Kennametal, Inc. Coated tools were also included in the investigation to gage their effect on tool life. TiC/TiN and TiAlN coatings were selected for investigation. WC/Co cutting tools having TiC/TiN and TiAlN coatings were, respectively, KC850 and KC5010 inserts commercially available from Kennametal, Inc. For all investigations, the tool geometry was SPG422, the tool holder was CSRPL-164D, the side rake angle was +5 degrees, the lead angle was +15 degrees, the back rake angle was 0 degrees, the nose radius was 0.8 mm, and the edge radius was 0.012 mm.

Prior to each machining operation, the surface of each workpiece was sandblasted and coated with Cotronics 931 Graphite Adhesive to increase the absorptivity of the workpieces at the laser beam wavelength of 10,600 nm. However, it should be noted that the use of such a coating can be completely eliminated if a laser is used with a wavelength of less than 1200 nm. During machining, cutting forces were measured with a three-component dynamometer at a sampling rate of 100 Hz. The cutting force and depth of cut were used to calculate specific cutting energy. The machined surface roughness was measured at nine locations on the workpieces with a surface profilometer. Tool wear was measured with a optical microscope with a micrometer x/y stage. The microstructures of the machined workpieces were examined with a scanning electron microscope (SEM) using an accelerating voltage of 15 keV. Microhardness measurements were conducted with a microhardness tester.

In order to accurately explore and control the machining processes to be evaluated, thermal modeling and validation were undertaken to predict the temperature distributions in the workpieces resulting from irradiation and machining. Thermal modeling employed a transient 3-D finite volume thermal model reported in Tian et al., "Thermal Modeling for Laser-Assisted Machining of Silicon Nitride Ceramics with Complex Features," Journal of Manufacturing Science and Engineering, Transactions of the ASME 128 (2006), pp. 425-434, whose contents regarding the thermal modeling technique are incorporated herein by reference. Because the laser beam interacts with both uncoated and graphite-coated regions of the workpieces, input values to the thermal model included the absorptivity of the graphite-coated and uncoated titanium workpiece surfaces to the $CO_2$ laser wavelength to enable predictions for the amount of laser heating. The absorptivity of the graphite coating was measured to be 0.80 for a wavelength of 10,600 nm. The absorptivity of the uncoated surface regions was characterized by comparing temperature measurements from laser-heating experiments to thermal model predictions for a range of surface temperatures. The surface temperatures of laser-irradiated regions during LAM experiments were typically in a range of about 1000 to about 1600° C. Within this temperature range, absorptivity varies from 0.20 to 0.23. To simplify thermal modeling, absorptivity was fixed at 0.2 for all thermal modeling.

Figure 2:
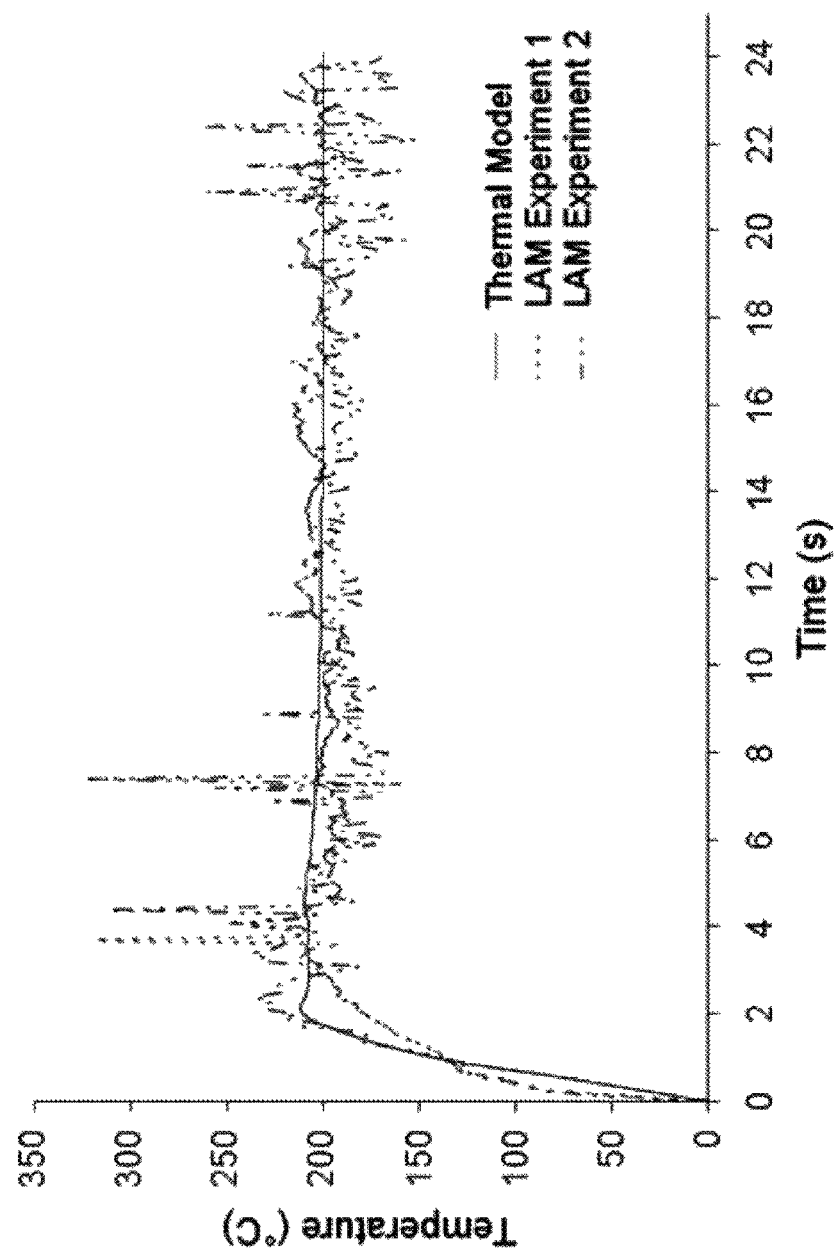
FIG. 2 is a graph evidencing a close correlation between temperatures predicted by a thermal model and temperatures measured during machining of titanium alloy workpieces during investigations leading to the present invention.

Validation of the thermal model was conducted by measuring the temperature of laser-irradiated graphite-coated surfaces of two workpieces using a non-contact infrared camera. An emissivity value of 0.85 was used for the graphite-coated surface. The IR camera tracked the maximum temperature along the center line of each workpiece at 10 frames/second. Cutting process parameters included a cutting speed ($V_c$) of 107 m/min, a feed rate (f) of 0.075 mm/rev, depth of cut (d) of 0.76 mm, and an average material removal temperature ($T_{mr}$) of 200° C. Results of the thermal model and irradiated workpieces are set forth in FIG. 2, which evidences good agreement between the measured and predicted data. Fluctuations observed in the temperature measurements were attributed to portions of the graphite coating debonding from the workpiece surfaces due to intense laser heating or rubbing with the chips.

A parametric relationship between the average material removal temperature ($T_{mr}$) and laser power (P), feed (f), cutting speed ($V_c$), and workpiece diameter ($D_w$) was developed to assist in the selection of cutting parameters corresponding to a particular material removal temperature. Several other parameters, including depth of cut (d), absorptivity (α), emissivity ($\epsilon_{IR}$), laser beam diameter ($D_f$=4 mm) and laser beam lead ($L_f$=2.5 mm), were held constant. The thermal model was run for a full-factorial (L96) experimental design that was created for the conditions provided in Table 1 below. The resulting data were subjected to multivariate regression analysis, which yielded the expression for $T_{mr}$ in Equation 1 below.

$$T_{mr}=e^{3.4}P^{0.66}/f^{0.31}D_w^{0.34}V_c^{0.31}$$

A high $R^2$ value of 0.998 indicated that the equation accurately captured the simulation data.

TABLE 1

| Parameter | Level 1 | Level 2 | Level 3 | Level 4 |
|---|---|---|---|---|
| $V_c$ (m/min) | 100 | 250 | 400 | — |
| P (W) | 100 | 500 | 1000 | 1500 |
| f (mm/rev) | 0.075 | 0.150 | — | — |
| d (mm) | 0.760 | — | — | — |
| $D_w$ (mm) | 30 | 40 | 50 | 60 |

3-D FEM machining simulations were also performed using the Third Wave systems AdvantEdge© machining simulation software. The module used for the simulations was the 3-D nose turning model, which was believed to best approximate an actual turning process because it accounts for the nose radius of the cutting tool and also represents cutting by the primary and secondary cutting edges of the tool. The updated-Lagrangian finite element method along with continuous remeshing and adaptive meshing techniques were applied in the model. Four-node, twelve degree-of-freedom tetrahedral finite elements were used to model the workpiece and tool. A mesh convergence study was conducted to arrive at the best possible values for the meshing. In all simulations, the standard mode was used with a minimum element edge length for the chip bulk and cutter edge of 0.0198 and 0.01 mm, respectively. The radius of the refined region was set as 0.075 mm. A mesh refinement factor of 5 was used and the default factor of 5 was used for the mesh coarsening. The boundary conditions were specified such that the top and back surfaces of the tool were fixed in all directions. The workpiece was constrained in vertical and lateral directions on the bottom surface and the workpiece moved at the specified cutting speed in the horizontal direction.

To run the simulations, material property definition is one of the most crucial aspects. Two material formulations for the Ti-6Al-4V alloy were used to check for discrepancy in the results. One of the materials selected for the simulation was from the default material library of the machining simulation software. The second constitutive model selected for the material was obtained from the following formulation and input into the machining simulation software as a user defined model with power law hardening.

The cutting tool used for the machining simulations was the K68 uncoated solid carbide tool insert described above. The standard tool geometry option was used in the simulations. The edge radius was measured and input in the machining simulation software as 0.16 mm. Cutting speeds of 107 and 150 m/min, a feed of 0.075 mm/rev and a depth of cut of 0.76 mm were used for the machining simulations. In the conventional machining case, the coefficient of friction was set as 0.47, which was calculated from experimental results for cutting forces. Material removal temperatures ($T_{mr}$) of 200° C., 250° C., 300° C. 400° C. and 500° C. were simulated for comparison purposes. The LAM conditions were simulated by changing the initial temperature of the workpiece to these material removal temperatures. The coefficients of friction for simulations conducted at $T_{mr}$ of 300° C., 400° C. and 500° C. were calculated from the experimental data to be 0.43, 0.45 and 0.42. respectively. Experiments were not conducted for $T_{mr}$ at 200° C. and 250, and the simulations at these temperatures used a coefficient of friction value of 0.43.

Further details of this simulation are reported in Dandekar et al., "Machinability Improvement of Titanium Alloy (Ti-6Al-4V) via LAM and Hybrid Machining," International Journal of Machine Tools & Manufacture 50 (2010), pp. 174-182, whose contents are incorporated herein by reference.

Figure 3:
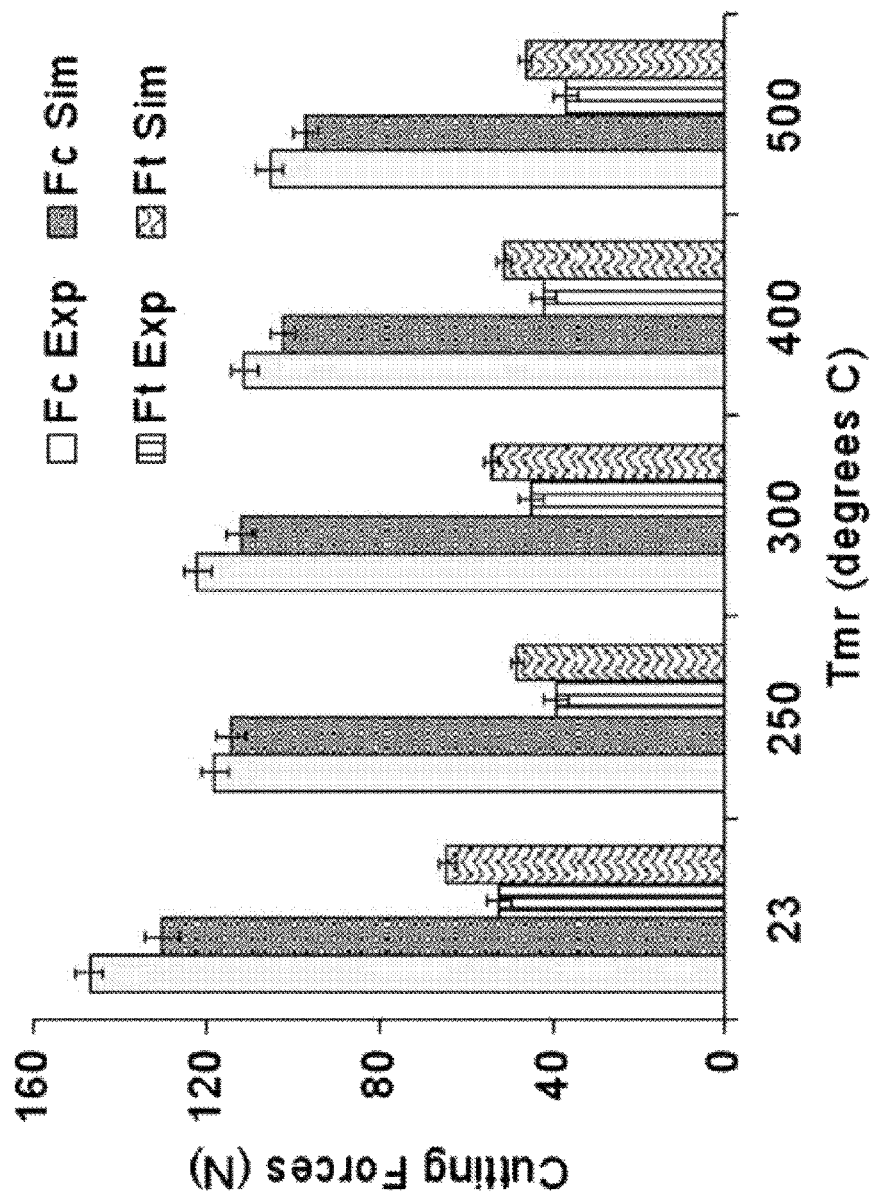
FIG. 3 is a bar graph comparing cutting forces and thrust forces predicted by an FEM machining simulation and measured during machining of titanium alloy workpieces during investigations leading to the present invention.

A comparison was made between the simulation and experimental results between the default material model and the user defined material model. The results indicated there was a very good correlation between the experimental and simulated cutting force (Fc) data, though a relative poor correlation existed between the experimental and simulated values for the thrust force (Ft) using the default material model. On the other hand, the user defined material model yielded a very good correlation between the experimental and simulated cutting force data and a much better correlation between the experimental and simulated thrust force data. FIG. 3 represents the data for simulations (Sim) and experimental results (Exp) obtained for a cutting speed of 107 m/min different material removal zone temperature. The trend observed in all the cases was similar, with the simulation under-predicting the cutting force by about 7-8% and over-predicting the thrust force by about 20-24%. Further tests were carried out for a cutting speed of 150 m/min, where the trends observed were very similar to the machining simulations at a cutting speed of 107 m/min.

Figure 4:
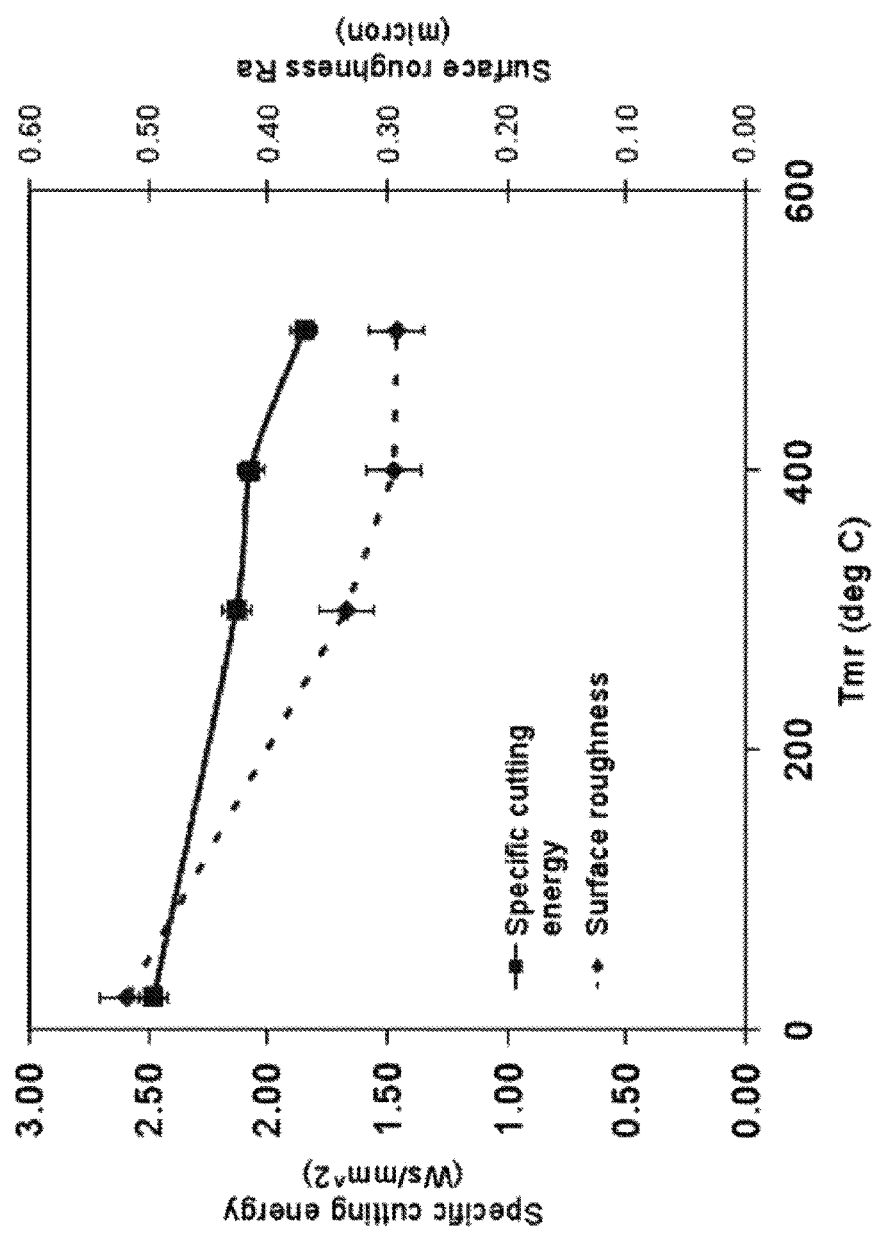
FIG. 4 is a graph plotting the effects that temperature within the removal zone of a titanium alloy workpiece was shown to have on surface roughness and specific cutting energy during investigations leading to the present invention.

A preliminary set of machining tests were conducted at a cutting speed of about 91 m/min, feed rate of about 0.075 mm/rev and depth of cut of about 0.76 mm. to gage the effect of $T_{mr}$, (300° C., 400° C. and 500° C.) on specific cutting energy and surface roughness. FIG. 4 shows the variation of specific cutting energy and surface roughness obtained in the tests as a function of $T_{mr}$. Both surface roughness and specific cutting energy substantially dropped when laser heating (LAM) was applied, though increasing $T_{mr}$ beyond 300° C. produced little additional improvement. The tests indicated that LAM and the hybrid machining (LAM plus selective cryogenic cooling of the cutting tool) reduced the specific cutting energy by up to 20% and the surface roughness by 30% as compared to conventional machining. The reduction in the specific cutting energy was attributed to the reduction of workpiece material strength and hardness resulting from the increase in workpiece temperature achieved with the laser. In the hybrid machining tests, the reduction in the specific cutting energy and the surface roughness were attributed to two factors. First, selective cooling of the cutting tool helped retain the hardness and strength of the tool material, lower tool-chip interface temperatures reduced the tool wear rate and therefore decreased the specific cutting energy, and lower friction between the tool flank face and the machined surface allowed for improved surface finishes. Second, laser heating reduced the strength and hardness of the material, thereby making machining easier.

Tool wear predictions were carried out through FEM modeling of titanium machining using the output from the machining simulation software described above. Because cobalt diffusion out of WC/Co cutting tools and into titanium chips was concluded to be the primary mechanism of tool wear, a model to predict the cobalt diffusion catalyzed crater wear rate was used. The tool wear model used the chip velocity and temperature at the tool-chip interface to predict the rate at which crater depth increases, and therefore assisted in arriving at an optimum material removal temperature for the hybrid machining process. The output of the model also predicted the temperature distribution on the tool rake face.

Experimental LAM tests were then conducted at material removal temperatures of about 23° C., 300° C., 400° C. and 500° C. to measure tool wear rates, which were then compared with the simulated results. On benchmarking the simulated results, further simulations were carried out for $T_{mr}$ of 150° C., 200° C., 225° C., 250° C. and 275° C. In LAM processes, an optimum material removal temperature exists that balances the heat generated due to plastic deformation and the additional heat flow due to the laser. As tool wear is primarily a function of tool-chip interface temperature, this balance should be realized to extract the maximum benefit. From the simulations, it was determined that this balance was achieved at a $T_{mr}$ of about 250° C., corresponding to the lowest wear rate observed in the simulations.

Figure 5:
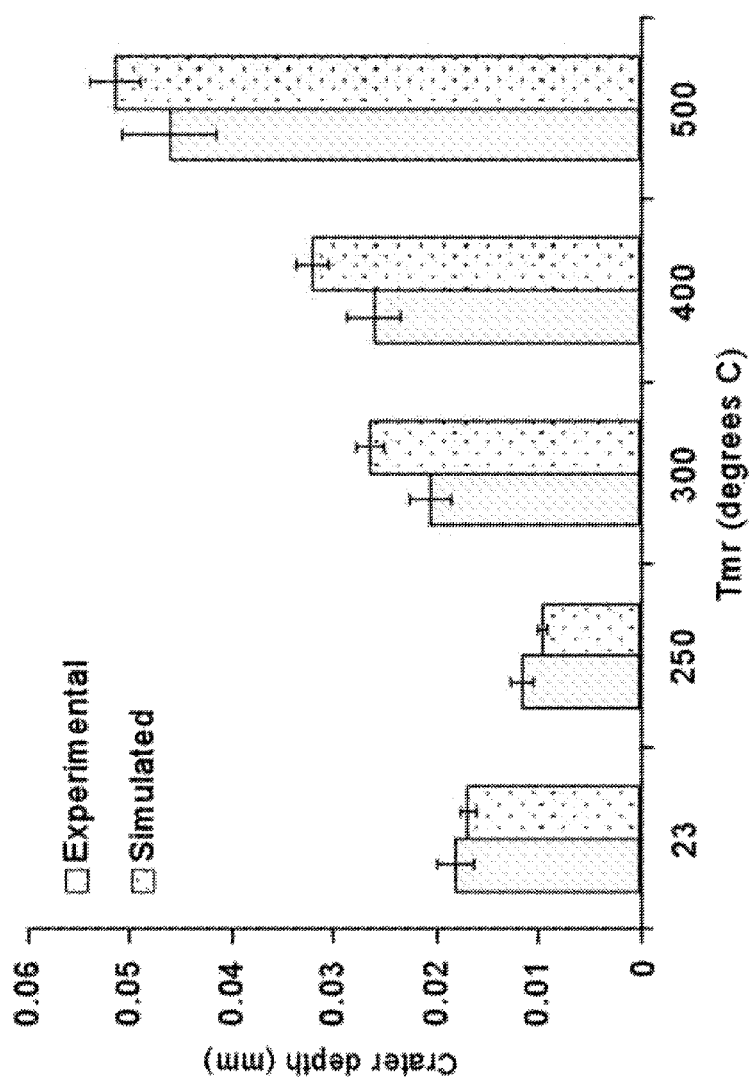
FIG. 5 is a bar graph comparing the effect that temperature within the removal zone of a titanium alloy workpiece was predicted and measured to have on cutting tool crate depth during investigations leading to the present invention.

FIG. 5 plots a comparison between the predicted tool wear results from the FEM model and the experimental tool wear results from the LAM tests at cutting speeds of 107 m/min. From this graph, it can be seen that the trends observed in the tool wear rates for the simulation values and experimental values agree well, thereby providing validation of the FEM model. It can also be seen in FIG. 5 that tool wear rates decreased significantly when the workpiece temperature ($T_{mr}$) was increased to 250° C., but further increases in workpiece temperature eventually offset the benefits of workpiece softening and resulted in significant increases in the tool wear rate.

Hybrid machining simulations were also undertaken to investigate the effect of cryogenic cooling on the tool wear rate. Lower wear rates were consistently observed for machining with cryogenic cooling compared with the results from the LAM tests. Similar to the model-predicted results and experimental LAM results, hybrid machining at a $T_{mr}$ of about 250° C. yielded the lowest wear rates. These results were attributed to lower tool-chip interface temperatures achieved by cryogenic cooling of the cutting tool in combination with the benefits of LAM, namely reduced strength and hardness of the workpiece material, which reduced the heat generated due to plastic deformation.

On the basis of the above simulation and experimental results, the optimum material removal temperature was concluded to be about 250° C. Further experimental tests were then carried out with higher cutting speeds. Parameters and results for these tests, which included conventional machining, LAM, and hybrid machining of Ti-6Al-4V workpieces, are summarized in Table 2 below.

TABLE 2

| Machining Condition | Tool Material | $T_{mr}$ (° C.) | d (mm) | f (mm/rev) | VC (m/min) | Tool life (cm³) |
|---|---|---|---|---|---|---|
| Conventional | K68 | 23 | 0.76 | 0.075 | 107 | 28.62 |
| | | | | | 150 | 16.60 |
| | | | | | 200 | 10.57 |
| | KC5010 | 23 | 0.76 | 0.075 | 107 | 48.54 |
| | | | | | 150 | 27.33 |
| | | | | | 200 | 18.45 |
| | KC850 | 23 | 0.76 | 0.075 | 150 | 18.25 |
| LAM | K68 | 250 | 0.76 | 0.075 | 107 | 48.78 |
| | | | | | 150 | 13.99 |
| | | | | | 200 | 3.19 |
| | KC5010 | 250 | 0.76 | 0.075 | 107 | 83.02 |
| | | | | | 150 | 27.88 |
| | | | | | 200 | 8.96 |
| Hybrid | K68 | 250 | 0.76 | 0.075 | 107 | 55.10 |
| | | | | | 150 | 38.56 |
| | | | | | 200 | 15.90 |
| | KC5010 | 250 | 0.76 | 0.075 | 107 | 142.56 |
| | | | | | 150 | 68.81 |
| | | | | | 200 | 34.87 |

Figure 6:
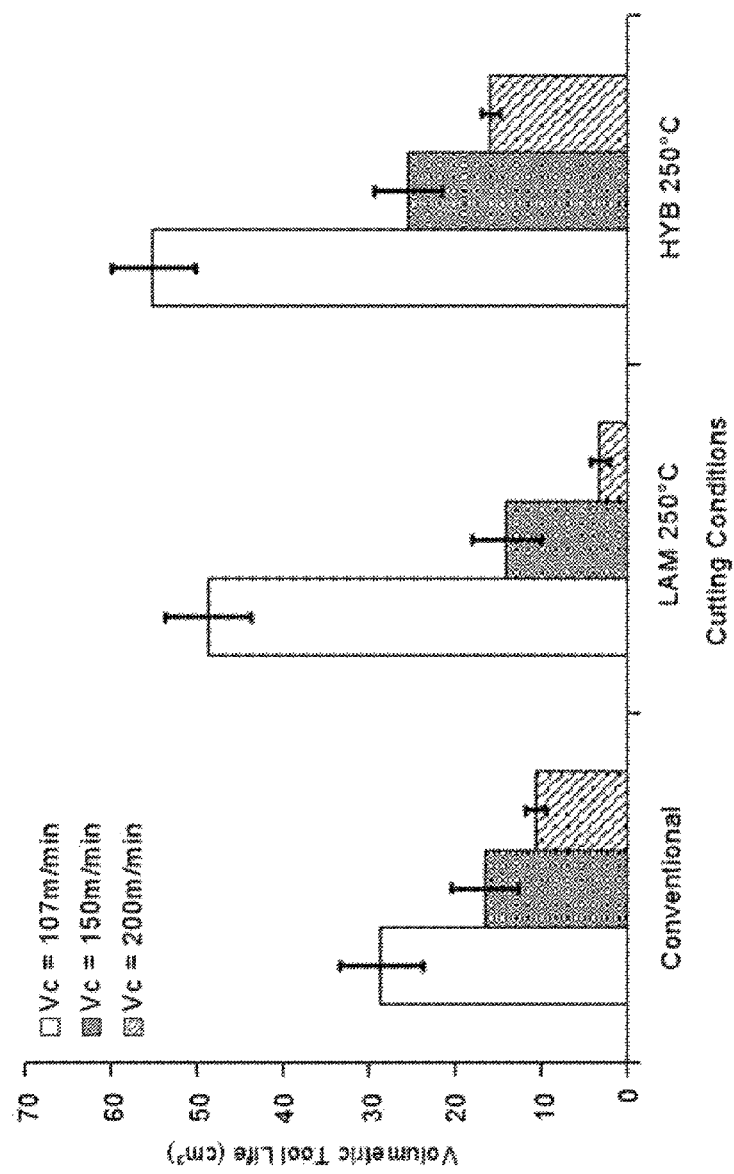
FIG. 6 is a bar graph comparing the effect of cutting speed on tool life when using conventional and LAM machining techniques of the prior art and a hybrid machining technique of this invention to machine titanium alloy workpieces during machining investigations leading to the present invention.

FIG. 6 compares the tool life data obtained with conventional machining ("Conventional") to that obtained with LAM ("LAM 250° C.") and the hybrid machining ("HYB 250° C.") techniques when the K68 (uncoated WC/Co) cutting tool was used at each of the three cutting speeds. Tool life increased about 1.7 times and about 2 times over conventional machining for the LAM and hybrid processes, respectively, at a cutting speed of 107 m/min. As $V_c$ was further increased to 150 and 200 m/min, the volumetric tool life, given in terms of workpiece material removed before tool failure, decreased in both LAM and conventional processes. On the other hand, hybrid machining yielded improved life over LAM and conventional processes for $V_c$=150 m/min and $V_c$=200 m/min. The conventional machining process created a larger heat-affected zone in the cutting tool than LAM or the hybrid processes. Since cobalt diffusion out of the WC/Co cutting tool weakened the tool and was primarily responsible for the crater wear and chipping, the improved tool life achieved with the hybrid machining technique was attributed to selective cooling of the cutting tool, resulting in lower temperatures and hence reducing the cobalt diffusion rate.

Figure 7:
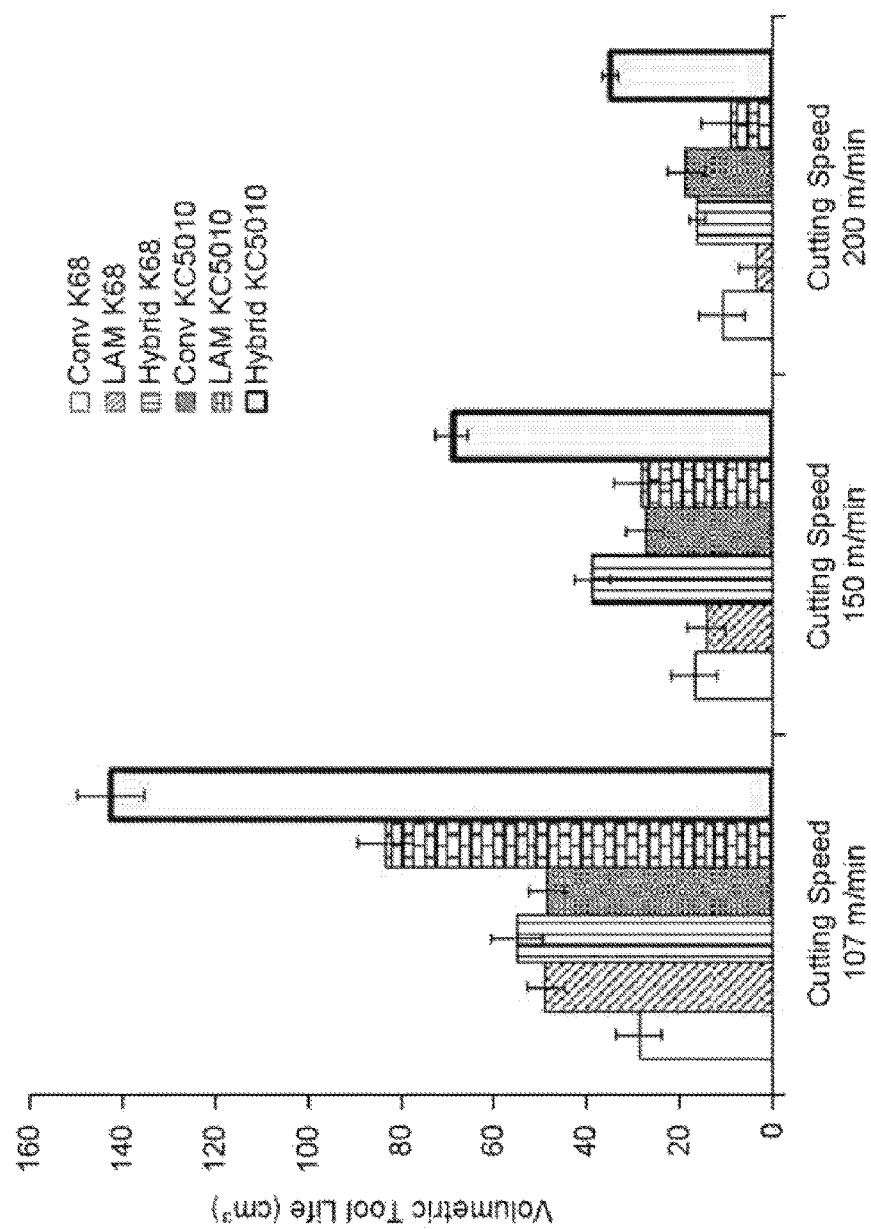
FIG. 7 is a bar graph comparing the effect of cutting tool material on tool life when using conventional and LAM machining techniques of the prior art and a hybrid machining technique of this invention to machine titanium alloy workpieces during machining investigations leading to the present invention.

Further hybrid machining and LAM tests were then carried out to further gage the effect of the tool material, and in particular the effect of TiC/TiN (KC850) and TiAlN (KC5010) coatings. In the results summarized in Table 2 above, it can be seen that the TiAlN coated tool (KC5010) exhibited much better life than the uncoated carbide tool (K68) and the TiC/TiN coated tool (KC850). On this basis, the TiAlN coated tool (KC5010) was selected over the TiC/TiN coated tool (KC850) for further testing with LAM and hybrid machining. FIG. 7 summarizes the data obtained for conventional, LAM and hybrid machining using the uncoated carbide tool (K68) and the TiAlN coated tool (KC5010). The data evidence improved tool wear performance using the TiAlN coated tool in both LAM and hybrid machining over conventional machining. Hybrid machining and LAM showed the most improvement in terms of material removed at the cutting speed of 107 m/min. Although LAM showed improvement over previous cutting tests with uncoated tools, the improvement was not as great as that obtained by hybrid machining at the three cutting speeds. The maximum tool life was observed for a cutting speed of 107 m/min in terms of the material removed through hybrid machining. At a cutting speed of 150 m/min, the tool life obtained by hybrid machining with the TiAlN coated tool was much better than any of the results obtained with an uncoated carbide tool at 107 m/min, while cutting at a speed of 200 m/min still showed slightly better life than conventional machining with the uncoated carbide tool at 107 m/min. In comparison with conventional machining with the same tool material, the tool life achieved through LAM and hybrid machining was almost 2 and 3 times for a cutting speed of 107 m/min, respectively, 2.5 times for a cutting speed of 150 m/min and 2 times for a cutting speed of 200 m/min. This indicates that a much higher material removal rate is feasible with hybrid machining. In terms of the surface roughness measurements, the results for the uncoated and coated tools were very similar, indicating that the coating had minimal effect on surface roughness.

Figure 8:
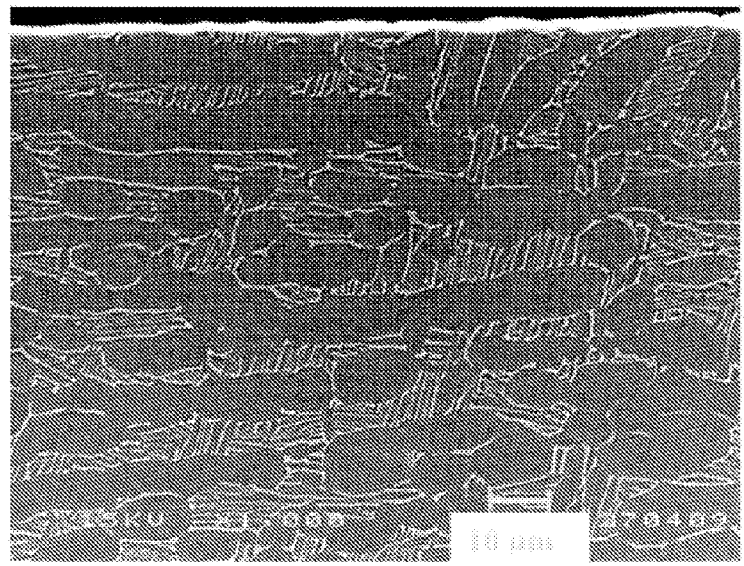
FIGS. 8 and 9 are scanned images of the microstructures of titanium alloy workpieces machined using a conventional machining technique of the prior art and a hybrid machining technique of this invention.
Figure 9:
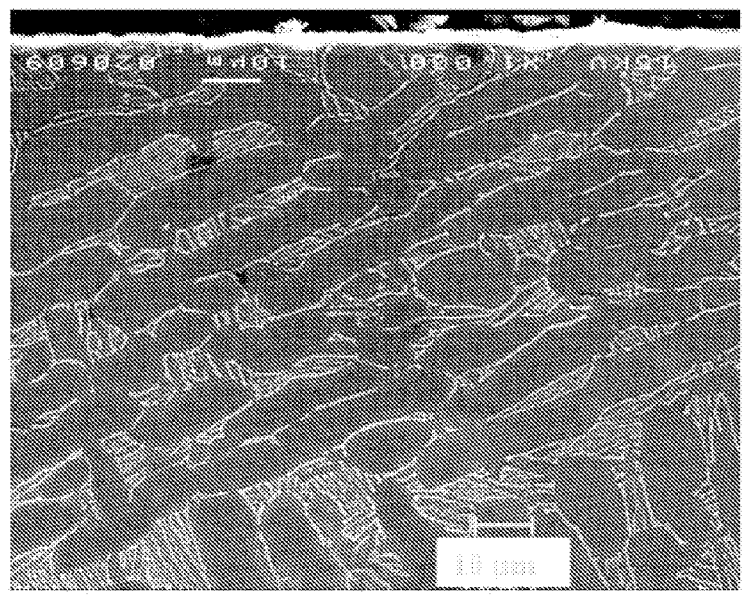

The microstructures were studied of four workpieces machined under different machining conditions. The workpieces were first sectioned using an abrasive saw with adequate cooling, after which the sectioned edges were polished using standard metallographic techniques (400, 500, 600 grits) with the final polishing stages using an aqueous suspension of 0.3 and 0.05 micrometer alumina. Etching was done using Kroll's reagent (92 ml of distilled water, 6 ml of nitric acid, and 2 ml of hydrofluoric acid). The microstructures were studied throughout each sample, paying close attention to the region close to the machined surface. FIGS. 8 and 9 show the micrographs of polished samples produced by hybrid and conventional machining, respectively. From these micrographs it can be seen there is no discernable difference between the microstructures achieved after hybrid machining and conventional machining, indicating laser heating did not adversely affect the resultant microstructure. The white bands observed in FIGS. 8 and 9 were possibly caused by the bevel edge created at the specimen boundary during polishing.

Figure 10:
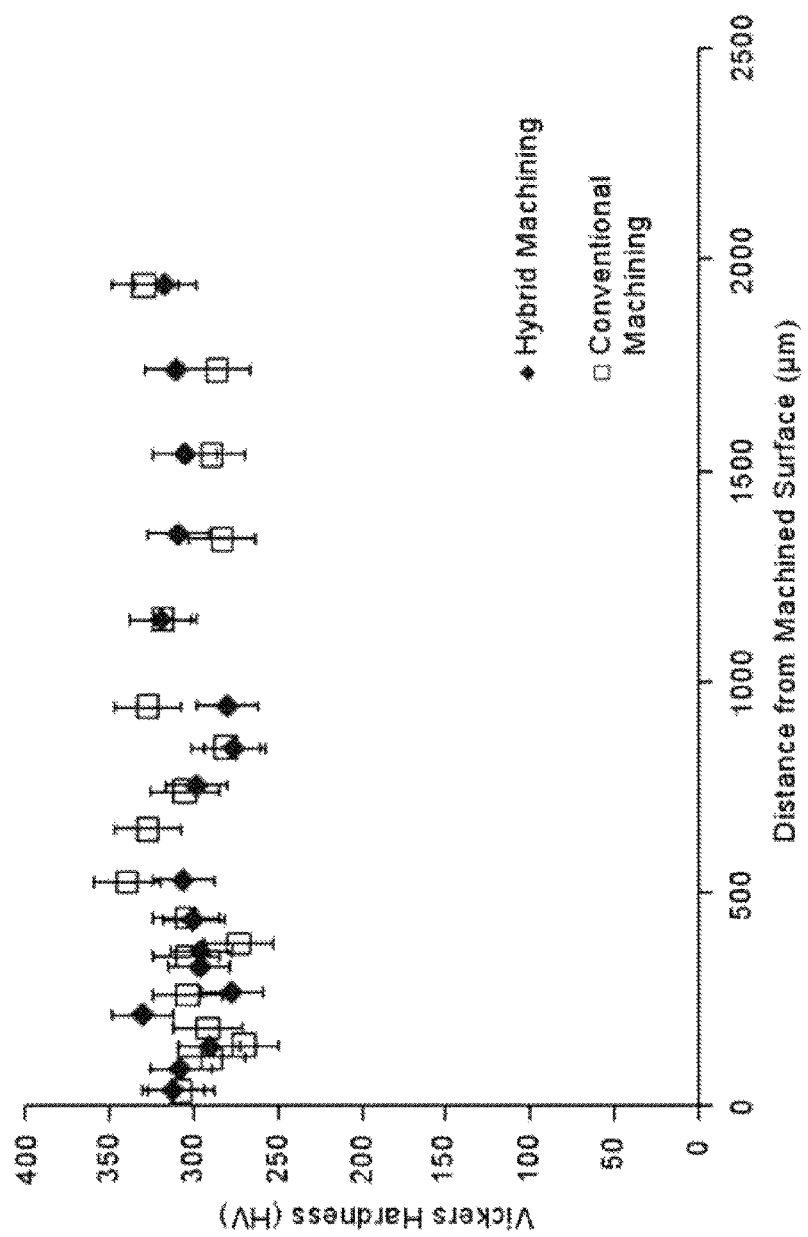
FIG. 10 is a graph comparing the hardness of titanium alloy workpieces machined using a conventional machining technique of the prior art and a hybrid machining technique of this invention.

Vickers hardness tests using a force load of 500 gf were then performed on samples that had been produced under two of the machining conditions. Three regions were selected on the samples of a conventional machining test and a hybrid machining test. The measurements were done up to a depth of about 2 mm and, as seen from FIG. 10, there was very little change in the hardness values from the surfaces of the samples to the 2 mm depth into the samples, indicating that both conventional and hybrid machining did not affect the microhardness of the samples. The measured average hardness was 297 HV for the conventional machined sample and 295 HV for the hybrid machined sample.

The thermal models were to useful to achieve more precise control of the laser heating in, as a result, favorable results in terms of the microstructure. The microhardness of the sample produced by hybrid machining evidenced that laser heating of the sample did not have any adverse effects.

From the experimental data, it was determined that the volumetric tool life ($TL_v$) had an exponential relationship with the cutting speed ($V_c$) in accordance with Equation 4 below, where m and C are constants determined from the experimental results.

$$TL_v = C * e^{m*Vc}$$

For all of the investigated operating conditions, increasing cutting speed resulted in lower tool life while yielding a higher material removal rate (MRR). An economic analysis indicated that the higher MRR values achieved with hybrid machining at higher cutting velocities more than offset the increased tool wear associated with increasing cutting velocity. The analysis further indicated that the hybrid machining process is economically beneficial when machining the Ti-6Al-4V alloy. Because the investigations discussed above suggest that higher cutting speeds are feasible with the hybrid machining process than with conventional machining processes, greater productivity should be achievable using the hybrid process.

Based on the foregoing, the hybrid machining process was concluded to significantly improve the machinability of titanium alloys, such as Ti-6Al-4V, with reduced specific cutting energy and improved surface roughness when compared to conventional machining. A material removal temperature of above room temperature (23° C.) but less than 300° C., and particularly about 250° C. was concluded to be optimum for the hybrid machining process, though it is foreseeable that suitable results may be achieved with material removal temperatures in a range of greater than 100° C. to about 275° C. At this material removal temperature, the hybrid machining process improved tool life by a factor of about 2 over conventional machining at cutting speeds of 107 m/min, and further improved machinability at cutting speeds beyond 150 m/min over conventional machining and LAM, thus offering the potential for high speed machining of Ti-6Al-4V. In addition, TiAlN-coated WC/Co cutting tools were found to perform two to three times better than uncoated WC/Co cutting tools at all cutting speeds using hybrid machining. Though more optimal results were obtained with a TiAlN coating, other coating materials suitable for use on carbide cutting tools and particularly WC/Co cutting tools may also be used, including TiC/TiN coatings. There was no discernable difference in the machined microstructure and the microhardness between conventional machining and hybrid machining. It is believed that the hybrid machining process using coated carbide tools is capable of achieving significant reductions in overall machining costs as a result considerable improvements in machinability of titanium through increased MRR and increased tool life. Finally, it should be noted that additional investigations in which cryogenic cooling of ceramic inserts were combined with plasma-enhanced machining (PEM) did not achieve similar benefits.

While the invention has been described in terms of specific embodiments, it is apparent that other forms could be adopted by one skilled in the art. For example, processing parameters such as temperatures could be modified, the equipment could differ in appearance and construction from that shown in the Figures, and appropriate materials could be substituted for those noted. Therefore, the scope of the invention is to be limited only by the following claims.

The invention claimed is:

1. A machining process comprising:
heating a portion of a workpiece formed of titanium or a titanium-based alloy with a laser beam;
cryogenically cooling a carbide cutting tool with a cryogenic fluid without flowing the cryogenic fluid onto the workpiece; and
machining the heated portion of the workpiece with the cutting tool, wherein the portion of the workpiece is heated by the laser beam so as to be at a temperature of greater than 100° C. to about 275° C. when machined by the cutting tool.

2. The machining process according to claim 1, wherein the portion of the workpiece is heated by the laser beam so as to be at a temperature of about 250° C. when machined by the cutting tool.

3. The machining process according to claim 1, wherein the cutting tool is cryogenically cooled by flowing the cryogenic fluid through a reservoir on a tool holder in which the cutting tool is mounted.

4. The machining process according to claim 1, wherein the cryogenic fluid is liquid nitrogen.

5. The machining process according to claim 3, wherein the cryogenic fluid evaporates after flowing onto the cutting tool within the reservoir and prior to any contact with the workpiece and excess cryogenic fluid exits the reservoir through an outlet.

6. The machining process according to claim 1, wherein the cutting tool is a WC/Co carbide cutting tool.

7. The machining process according to claim 6, wherein the WC/Co carbide cutting tool has a coating of TiAlN or TiC/TiN.

8. The machining process according to claim 6, wherein the WC/Co carbide cutting tool has a coating of TiAlN.

9. The machining process according to claim 1, wherein the workpiece is machined at a cutting speed of greater than 60 m/min.

10. The machining process according to claim 1, wherein the workpiece is machined at a cutting speed of greater than 100 m/min.

11. The machining process according to claim 1, wherein the workpiece is machined at a cutting speed of about 150 m/min or more.

12. The machining process according to claim 1, wherein the workpiece is machined at a cutting speed of about 100 to about 200 m/min.

13. The machining process according to claim 1, wherein the workpiece has a nominal composition of, by weight, about 6% aluminum, about 4% vanadium, the balance titanium and incidental impurities.

14. A machining apparatus comprising:
a carbide cutting tool;
means for heating a portion of a workpiece formed of titanium or a titanium-based alloy with a laser beam prior to being machined with the cutting tool; and
means for cryogenically cooling the cutting tool with a cryogenic fluid without flowing the cryogenic fluid onto the workpiece;
wherein the cutting tool is mounted in a tool holder, the cryogenic cooling means comprises a reservoir on the cutting tool and from which the cryogenic fluid flows onto the cutting tool, and the cryogenic cooling means is adapted to cause the cryogenic fluid to evaporate after flowing onto the cutting tool within the reservoir and prior to any contact with the workpiece and excess cryogenic fluid exits the reservoir through an outlet.

15. The machining apparatus according to claim 14, wherein the cryogenic fluid is liquid nitrogen.

16. The machining apparatus according to claim 14, wherein the cutting tool is a WC/Co carbide cutting tool.

17. The machining apparatus according to claim 16, wherein the WC/Co carbide cutting tool has a coating of TiAlN or TiC/TiN.

18. The machining apparatus according to claim 16, wherein the WC/Co carbide cutting tool has a coating of TiAlN.

19. The machining apparatus according to claim 14, wherein the workpiece has a nominal composition of, by weight, about 6% aluminum, about 4% vanadium, the balance titanium and incidental impurities.

20. The machining apparatus according to claim 14, wherein the machining apparatus is mounted to a lathe.

* * * * *